Sept. 20, 1971  SABURO YOSHIKAWA  3,605,248
METHOD OF PRODUCING BICYCLE LUGS
Filed May 19, 1969  4 Sheets-Sheet 1
FIG. I(A)
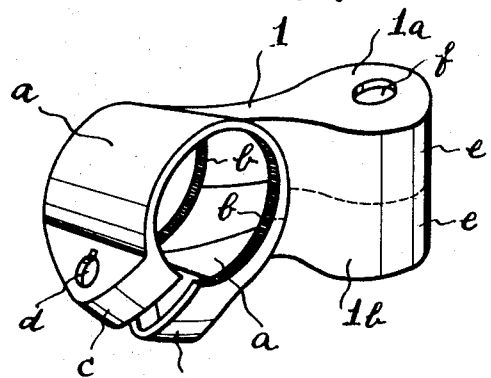
FIG. I(B)
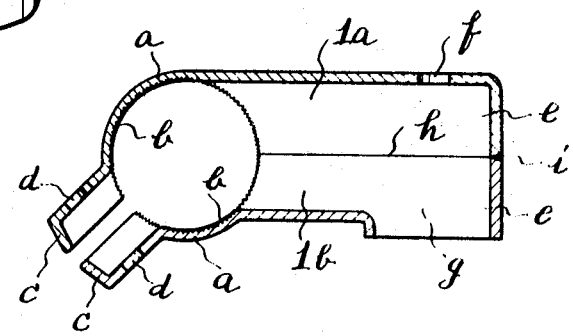
FIG. 2(A)
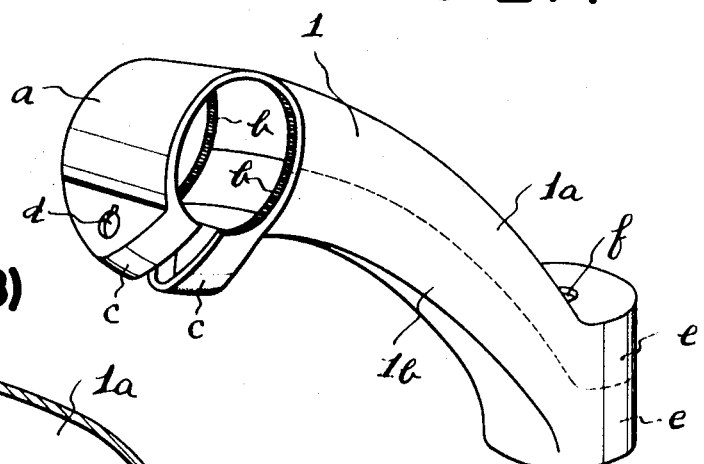
FIG. 2(B)
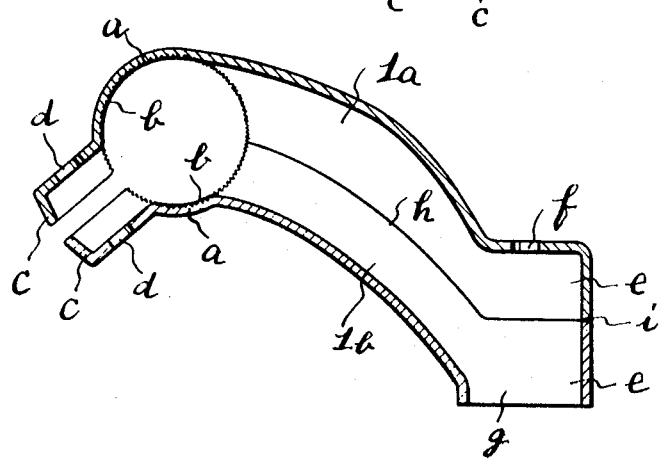

Sept. 20, 1971  SABURO YOSHIKAWA  3,605,248
METHOD OF PRODUCING BICYCLE LUGS

Filed May 19, 1969  4 Sheets-Sheet 3

United States Patent Office 3,605,248
Patented Sept. 20, 1971

3,605,248
METHOD OF PRODUCING BICYCLE LUGS
Saburo Yoshikawa, Tokyo, Japan, assignor to Nitto Handle Works Co., Ltd., Tokyo, Japan
Filed May 19, 1969, Ser. No. 825,535
Claims priority, application Japan, Feb. 21, 1969, 44/12,586
Int. Cl. B23k *1/20, 31/02*
U.S. Cl. 29—482                5 Claims

ABSTRACT OF THE DISCLOSURE

This disclosure is to produce various shapes of lugs for use in the handle of a bicycle by separately producing the upper and lower parts of a lug having substantially the same shape from a plate and electrically welding said parts at their joined portion and effect the automation of the manufacture of the lug by automatically introducing the stamped plates into the subsequent steps by providing metal molds in all process steps for stamping and a transfer unit in a press.

SUMMARY OF THE INVENTION

This invention relates to a lug for use in the handle of a bicycle, a method of producing the same, and an apparatus therefore, and it is, therefore, an object and feature of the present invention to provide various shapes of lugs consisting of upper and lower parts having substantially the same shape produced by externally drawing a plate matter and stamping, the joining portions of said upper and lower parts are formed into the same shape, roulettes are provided at the handle bar holding portions of the two parts if necessary, and said two parts separately produced are electrically welded at their joined portion to form an integral body, further to provide a novel method of automating the production of the lug, wherein stamping metal molds in all process steps are provided in a high flex press, and a transfer unit is provided for feeding the stamped matters to automatically transfer them to the subsequent steps, whereupon the production cost will be reduced by the improvement in the operational efficiency, the reduction of personnel expenses and the increase in the number of the manufactured articles.

Heretofore, lugs have been generally manufactured by casting. However, those manufactured by this method have been applied to paring of casting skins, mechanical processing, and operations to smoothen the surfaces by subjecting them to treatment using a grinder for galvanization. Those manufactured by this casting method are apt to be generally uneven and, therefore, it has been impossible to provide a roulette at the handle bar holding portion.

Also, it is possible to consider the manufacture of lugs by the general press operation, but as when lugs having a complex shape are produced integrally by the conventional method several steps are required and a press generally carries out only one step, it has been impossible to carry out said manufacture of lugs by the general press operation when the improvement in the operational efficiency, the cost and the number of the workers are considered.

In the present invention, to eliminate the aforementioned conventional drawbacks, a lug is divided into two parts, the upper and lower parts, having substantially the same shape for easy production thus, a transfer unit and metal molds in all process steps are provided in a high flex press, therefore the material iron strip is gradually and automatically fed to the respective steps, thus said upper and lower parts are produced automatically, the two parts are subjected to a projection welding, thus the automation of the manufacture of lugs being effected.

BRIEF DESCRIPTION OF THE DRAWING

FIGS. 1(A) and (B) and FIGS. 2(A) and (B) are perspective views respectively showing the shape of a lug in accordance with the present invention and side views in the central vertical section showing the same;

DESCRIPTION OF THE PREFERRED EMBODIMENT

Figure 3A:
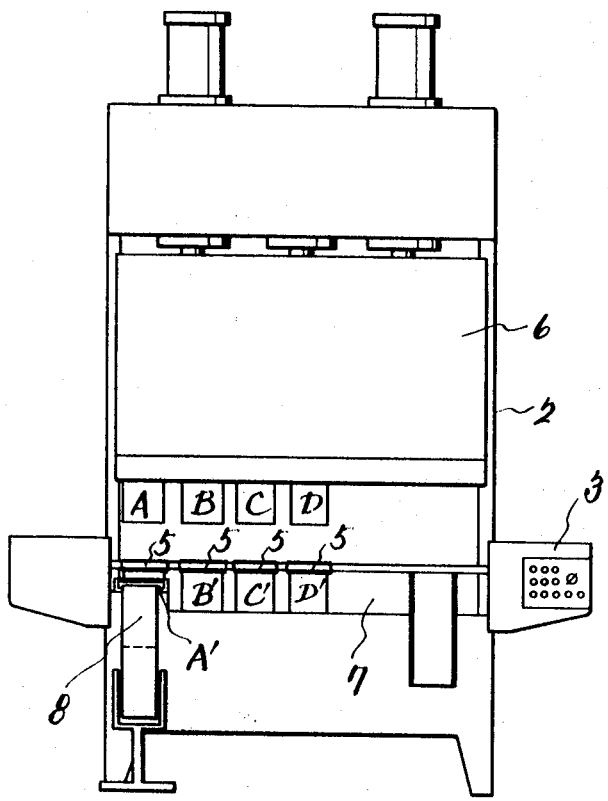
FIGS. 3(A) and (B) are respectively a front view of a press for carrying out stamping in the apparatus according to the present invention and an enlarged plan view, partly cut away, of a feed mechanism provided in the press.

This invention relates to a lug for use in the handle of a bicycle, a method of producing the same and an apparatus therefor, and it is an object to improve the construction of the conventional lugs for ready practical automation, and obtain the reduction of the production cost and the number of the workers by mass production.

To accomplish the abovementioned object, the first feature of the present invention is to produce the lugs by processing a plate matter, thus the automation of the manufacture of the lugs as later described can be effected, and further to omit a number of steps required for after treatment of the casting lugs, thus the same lugs are manufactured mass-productively.

The second feature is to separately produce the upper and lower parts of the lug having substantially the same shape, not to produce the lugs integrally as the conventional method, and further to employ the step where said two parts are welded at their joined portion to form an integral body. Therefore the upper and lower parts can be produced by a very simple press processing method requiring several steps for each part, thus the automation in the process steps is readily effected:

The third feature is, in the production of the upper and lower parts, the use of a high flex press provided with a transfer unit and metal molds in all process steps. Thus the feeding of all process steps and the press processing of each step are carried out during each stroke in said high flex press and if the material plate is supplied from one side the lugs are provided gradually and automatically from the other side. Therefore, in combination with the second feature, the automation of the manufacture of the lugs which has been conventionally impossible can be effected.

The fourth feature of the present invention is to employ a projection welding method in the welding of the upper and lower parts, thus the complete lugs can be manufactured by welding the upper and lower parts very readily without employing very large welding equipment.

Other features of the present invention will be known by the description of an embodiment of the present invention relating to the accompanying drawings.

FIGS. 1 and 2 show respectively two embodiments of the lugs in accordance with the present invention in the separate shapes. Said lug 1 is formed by producng an upper part $1_a$ and a lower part $1_b$ of said lug 1 separately by means of a press 2 which will be later described and then joining both parts $1_a$ and $1_b$. In the upper and lower parts $1_a$ and $1_b$ the handle bar holding portions $a$ and $a$ are worked into the semi-cylindrical shape and roulettes $b$ and $b$ are provided in the inner peripheral portions of said handle bar holding portions $a$ and $a$. At the forward portions of the handle bar holding portions $a$ and $a$ there are projected handle bar clamping portions $c$ and $c$ and at the central portions of the handle bar clamping portions $c$ and $c$ there are formed bolt penetrating holes $d$ and $d$. At the rear parts of the handle bar holding portions $a$ and $a$ there are curvedly formed handle stem fitting portions $e$ and $e$ and at the upper side of the upper part $1_a$ there is formed a penetrating hole $f$ for a lifting bar for fitting to the handle stem. At the bottom of the lower part $1_b$ there is formed a short cylindrical protruded portion $g$, and the handle stem (not shown) is inserted from said portion $g$ and fixed.

The aforementioned upper and lower parts $1_a$ and $1_b$ are electrically welded instantaneously by a projection spot welder 9 which will be later described at their joined portion $h$ as shown in FIGS. 1 and 2 to form an integral body, thus the lug 1 being constituted.

Explaining the apparatus for producing the upper and lower parts $1_a$ and $1_b$ of lug 1, the apparatus shown in FIGS. 3(A) and (B) is a high flex press 2 which can carry out all steps for stamping lugs and is provided with a transfer unit 3 for automatically feeding the stamped matters to the subsequent process steps. Reference numeral 4 designates a feed mechanism operated by the transfer unit 3, two bars are provided in parallel and at the suitable portions of said two bars gripping tools 5 which grip matters to be formed in accordance with the process steps respectively are provided. Reference numeral 6 designates a press hammer, at the suitable positions of the lower side of the press hammer 6 upper metal molds, A, B, C and D in all process steps being provided. At a table 7 lower metal molds A', B', C' and D' for said upper metal molds, A, B, C and D are provided.

Figure 3B:
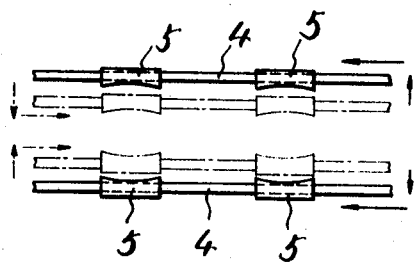
Figure 6:
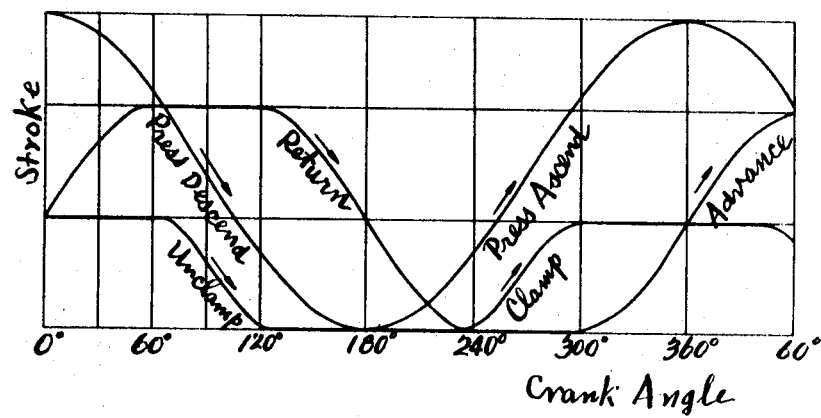
FIG. 6 is a timing diagram showing the relationship between the operation of a press hammer and that of a feed mechanism of a transfer unit.

Then, the operational relationship between the aforementioned feed mechanism 4 and the press hammer 6 will be explained hereinbelow. As shown in a timing diagram of FIG. 6, with the descent of the press hammer 6 the bars of the feed mechanism 4 shown in FIG. 3(B) open outwardly while sliding in the direction shown by the arrow of the full line. When the press hammer 6 begins to lift from the lower dead point, the bars of the feed mechanism 4 are closed at a suitable interval inwardly as shown by the arrow of the one-dot chain line, and at this state the matters in the middle steps are gripped by the gripping tools 5, and slid in the direction shown by the arrow of the one-dot chain line to the subsequent process steps. By these repeated operations the process is carried out automatically.

The metal molds A and A' to D and D' provided in the high flex press 2 having the aforementioned structure are applied to the first to fourth steps. The process steps of the manufacture of the lugs will be explained by referring to the upper part $1_a$ hereinbelow.

Figures 4A, 4B, 4C:
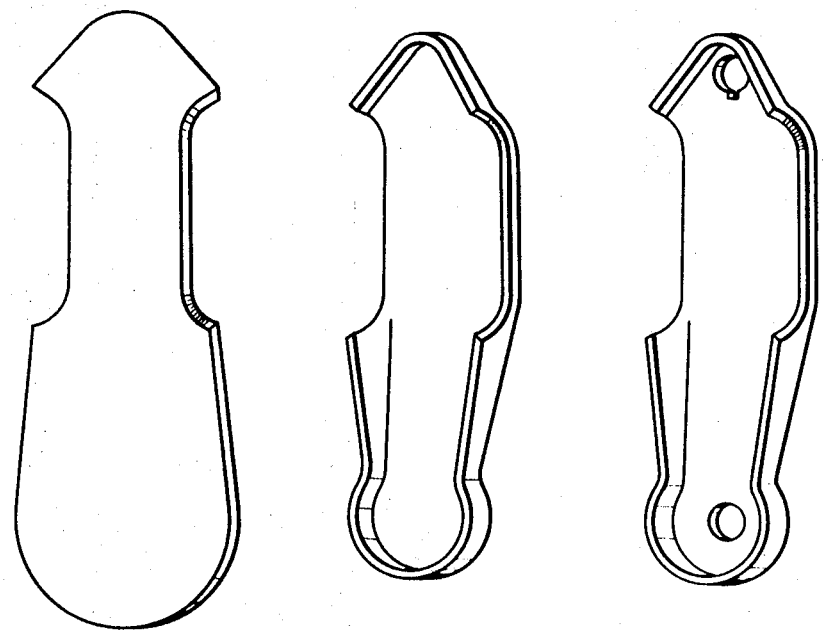
FIGS. 4(A), (B), (C) and (D) are respectively a perspective view of the shape of an upper part of a lug in the respective process steps.
Figure 4D:
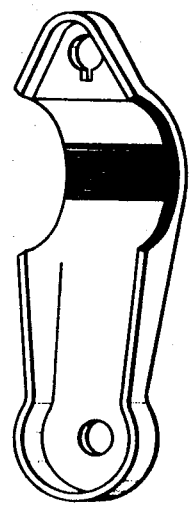

Firstly, an iron strip 8 is introduced into the metal mold A' in the first step and the external drawing as shown in FIG. 4(A) is carried out. Then, the externally drawn iron plate is introduced into the metal mold B' in the second step and subjected to a reduction processing as shown in FIG. 4(B), whereby the outer peripheral portion and the joining portion are formed. Then it is introduced into the metal mold C' in the third step and punched as shown in FIG. 4(C). Then, when it is introduced into the metal mold D' in the fourth step from the third step, the handle bar holding portion is rounded and concurrently the roulette is provided.

The process step of the manufacture of the lugs has been described in the foregoing by referring to the upper part $1_a$. However, in the lower part $1_b$ the number of the steps required is larger than that in the upper part $1_a$ by one step. More particularly the number of the steps required in the upper part $1_a$ are four, i.e. external drawing→reduction processing→punching→rounding processing (concurrently providing roulette). In contrast, the number of the steps required in the lower part $1_b$ are five, i.e. external drawing→reduction processing→punching →forming a protruded portion→rounding processing (concurrently providing roulette).

Figure 5:
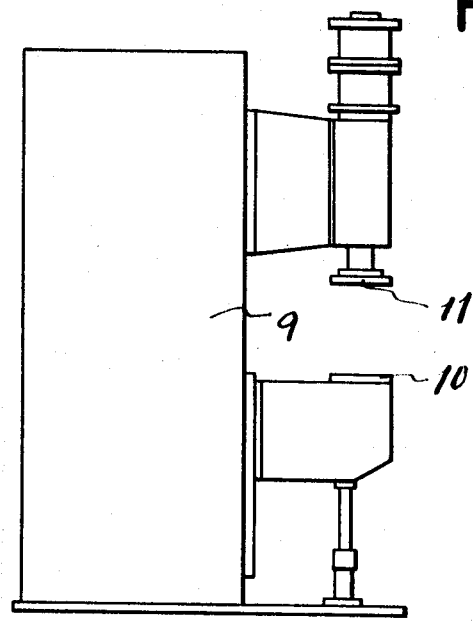
FIG. 5 is a side view of a projection spot welder in the apparatus according to the present invention.

As has been described in the foregoing, the upper and lower parts $1_a$ and $1_b$ produced separately are set together all along the edges thereof and placed on the table 10 of the projection spot welder 9 as shown in FIG. 5 and the electrode 11 descends and electricity flows instantaneously (within a second), whereby the both parts are completely poined, thus the lug 1 being constituted.

In this manner, in the present invention the manufacture of the lugs is carried out by providing the metal molds in all process steps in a high flex press, automating the introduction of the matters in the middle steps gradually to the subsequent steps by the feed mechanism of the transfer unit, and carrying out the welding operation by use of the projection spot welder, hence the working efficiency is improved more than 10 times, i.e. 4000 pieces a day from 250–300 pieces a day, as compared with the case of the conventional apparatus, whereby the production cost can be reduced and the dangerous manual operations can be eliminated by the automation of the all process steps, hence the present invention has great advantages in the prevention of danger.

Further, in the present invention the lugs are manufactured by producing the upper and lower parts separately and welding both parts at their joined portion, and hence, when various shapes of metal molds are prepared for changing with each other, it is possible to manufacture various shapes of lugs.

I claim:

1. A method for producing bicycle handle lugs comprising forming upper and lower asymmetrical pieces of said lug, and welding said pieces together to form said lug, said upper piece being formed in a single pressing unit by the steps of (a) stamping a first form from sheet metal, (b) reducing processing said first form to selectively bend the periphery thereof perpendicular to the remainder of said first form, (c) hole punching said process first form to form a clamping bolt hole and a lifting bar positioning hole, and (d) selectively bending said first form to produce a final shape while forming roulettes in said first form adjacent to said clamping bolt hole, said lower piece being formed in a single pressing unit by the steps of, (a) stamping a second form from sheet metal, (b) reduction processing said first form to selectively bend the periphery thereof perpendicular to the remainder of said form, (c) forming a clamping bolt hole in said processed second form, (d) forming a protruding lift bar positioning hole, and (e) selectively bending said second form to produce a final shape while forming roulettes in said second form adjacent to said clamping bolt hole.

2. The method of claim 1 wherein said roulettes on said upper piece are along a portion of said bent periphery and the inner face of said upper piece.

3. The method of claim 1 wherein said roulettes on said lower piece are along a portion of said bent periphery and the inner face of said upper piece.

4. The method of claim 1 wherein said welding is done by an electric arc spot welder.

5. The method of claim 1 wherein there is a space between the welded upper and lower pieces at the area adjacent to said clamping bolt holes.

References Cited

UNITED STATES PATENTS

| | | | |
|---|---|---|---|
| 2,487,661 | 11/1949 | McCauley Jr. | 287—52.02 |
| 3,361,455 | 1/1968 | Hussey et al. | 287—52.02 |
| 3,425,722 | 2/1969 | McCauley | 287—52.02 |
| 1,485,443 | 3/1924 | Torbensen | 29—475X |
| 1,729,180 | 9/1929 | Murray | 29—475X |
| 1,811,678 | 6/1931 | Smith | 29—475X |
| 2,674,783 | 4/1954 | Schneider et al. | 29—475X |

JOHN F. CAMPBELL, Primary Examiner

R. B. LAZARUS, Assistant Examiner

U.S. Cl. X.R.

287—52.02